United States Patent [19]

Fauteux et al.

[11] Patent Number: 5,589,300

[45] Date of Patent: Dec. 31, 1996

[54] SMALL PARTICLE ELECTRODES BY AEROSOL PROCESS

[75] Inventors: Denis G. Fauteux, Acton; Arthur A. Massucco, Natick; Ronnie D. Wilkins, Melrose, all of Mass.

[73] Assignee: Arthur D. Little, Inc., Cambridge, Mass.

[21] Appl. No.: 447,137

[22] Filed: Jun. 6, 1995

Related U.S. Application Data

[63] Continuation of Ser. No. 126,918, Sep. 27, 1993, abandoned.
[51] Int. Cl.[6] .................................................. H01M 4/48
[52] U.S. Cl. ........................... 429/218; 429/223; 429/224; 427/263; 427/126.6; 427/427
[58] Field of Search ........................... 423/599; 427/126.3, 427/126.6, 427; 429/218, 223, 224

[56] References Cited

U.S. PATENT DOCUMENTS

| | | | |
|---|---|---|---|
| 4,352,866 | 10/1982 | Klinedienst et al. | |
| 4,649,061 | 3/1987 | Rangachar | 427/427 X |
| 4,719,126 | 1/1988 | Henery | 427/427 X |
| 4,960,324 | 10/1990 | Brown | |
| 5,120,703 | 6/1992 | Snyder et al. | 427/126.3 X |
| 5,158,843 | 10/1992 | Batson et al. | |
| 5,169,736 | 12/1992 | Bittihn et al. | 429/223 X |
| 5,264,201 | 11/1993 | Dahn et al. | 429/224 X |
| 5,294,499 | 3/1994 | Furukawa | 429/224 X |

FOREIGN PATENT DOCUMENTS

| | | |
|---|---|---|
| 1179724 | 7/1989 | Japan . |
| 2009722 | 1/1990 | Japan . |
| 2080303 | 3/1990 | Japan . |
| 2137709 | 5/1990 | Japan . |
| 3105854 | 5/1991 | Japan . |
| 3236157 | 10/1991 | Japan . |
| 4104461 | 4/1992 | Japan . |
| 4255667 | 9/1992 | Japan . |

OTHER PUBLICATIONS

Ogihara et al., "Preparation of Spherical $LiCoO_2$ Powders by the Ultrasonic Spray Decomposition and Its Application to Cathode Active Material in Lithium Secondary Battery", *Journal of the Ceramic Society of Japan*, International Edition 101(10), Tokyo (Oct. 1993).

*Industrial Electrostatic Precipitation*, H. J. White; Addison–Wesley Publishing Company, Inc., Reading, Massachusetts (1963) (Cover page only included).

*Atomization and Sprays*, A. H. Lefebvre; Hemisphere Publishing Corp., New York, New York (1989) (Cover page only included) (month unknown).

V. A. Marple and K. Willeke, "Impactor Design" *Atmosphere Environment* 10, 891–896 (Apr. 1976).

Ward et al. "Characteristics of Bi–Pb–Sr–Ca–Cu–O powders produced by aerosol decomposition and their rapid conversion to the high-$T_c$ phase" *Physica C* 200, 31–42 (Sep. 15, 1992).

Chadda et al. "Synthesis of $YBa_2Cu_3O_{7-y}$ and $YBa_2Cu_4O_8$ by Aerosol Decomposition" *J. Aerosol Sci.* 22(5), 601–616 (Sep. 1991).

*Primary Examiner*—Stephen Kalafut
*Attorney, Agent, or Firm*—Dick and Harris

[57] ABSTRACT

A method for preparing an electrode is provided including generating aerosol droplets of a precursor capable of being converted into a component of an electrode in a carrier liquid; converting the droplets into precursor particles; converting the precursor particles into particles of the electrode component; and depositing the electrode component onto an electrically conductive substrate. The electrode is characterized by a highly porous structure having a surface area in the range of >4 $m^2/g$ and a discharge density at least 1.5 times greater than comparable electrodes prepared by conventional methods.

42 Claims, 3 Drawing Sheets

SMALL PARTICLE ELECTRODES BY AEROSOL PROCESS

This is a continuation of application(s) Ser. No. 08/126,918 filed on Sep. 27, 1993 now abandoned.

FIELD OF THE INVENTION

The present invention relates to fine particle electrode structures. In particular, it relates to fine particle electrodes prepared using aerosol processes.

BACKGROUND OF THE INVENTION

Recent progress in battery development have required the use of high surface area electrodes for large energy and power density capabilities. In such high energy density cells, finely divided powders of cathode component materials, such as lithium metal oxides ($LiM_xO_y$), are deposited over a large surface area and are impregnated with an electrolyte.

For maximum surface area and optimal arrangement of the cathode component materials on a suitable substrate, it is desired that the electrode component materials be finely divided and of a relatively narrow particle size distribution. Porous particles are particularly desirable because they provide a large surface area to volume ratio. Agglomeration of individual particles is not considered desirable because surface area is minimized and irregularly shaped agglomerates do not stack well, which is in conflict with the need for small physical size in the electrode. Similarly, wide distribution of particles sizes have a significant deleterious effect on energy density of the cell.

Finely divided powders have been difficult to obtain and to deposit with control of layer thickness and uniformity. For preparation of powders of cathode component materials, such as $LiM_xO_y$, conventional thermal processing followed by grinding and classification are commonly used. In such processes, metal oxides and lithium and/or lithium salts, for example, are ground together to commingle and comminute the materials, which are then reacted at high temperatures to promote formation of the $LiMn_yO_x$ crystalline structure. Repeated steps of grinding and thermal processing are often required to obtain significant conversion of the starting materials to the desired lithium metal oxide. However, even after prolonged heat treatment and grinding, conversion may be incomplete and the particle size of the product may be undesirable. The prior art has heretofore lacked a method for the production of fine particle cathode materials for the fabrication of electrode structures.

Thin electrode structures have been prepared by applying a fine particle slurry onto a substrate, in particular by ultrasonic assisted spraying, and by spraying dry particles onto a substrate (see, U.S. Pat. No. 5,158,843 to Batson et al. and JP 4104461 A, for example). In such methods, however, particle composition, particle size, and particles size distribution are determined during earlier manufacture of the particles, which is subject to the limitations described above.

Transition metal oxide layers have been applied to substrates using pyrolytic decomposition, in which a precursor solution is sprayed onto a heated substrate where it decomposes to form a metal oxide coating (see, U.S. Pat. No. 4,960,324 to Brown). However, pyrolytic decomposition does not permit the formation of finely divided powders having a large surface area.

It is desirable to provide a method for the preparation of electrode materials of small dimension and large surface area which overcome many limitations of the prior art as described herein above. It is further desirable to provide fine particle electrode materials of small dimension and possessing improved electrical properties.

SUMMARY OF THE INVENTION

According to one aspect of the invention, a fine particle electrode material for use in an electrochemical cell is prepared by generating droplets of a precursor in a carrier liquid, removing the carrier liquid from the droplets to obtain precursor particles, converting the precursor particles into particles of the electrode material, and depositing the electrode material onto an electrically conductive substrate.

The process according to the invention advantageously provides for the intimate mixing of precursors for enhanced reactivity during conversion of the precursor into the electrode material. The small particle size generated upon droplet formation permits rapid heat transfer during drying and conversion steps, and allows for the formation of particles and electrode materials not previously possible in the prior art. Electrochemical cells prepared using the materials of the invention exhibit discharge capacity that is one and a half times and, preferably three times, greater than comparable cells prepared using conventionally processed materials.

DESCRIPTION OF THE PREFERRED EMBODIMENT

Figure 1:
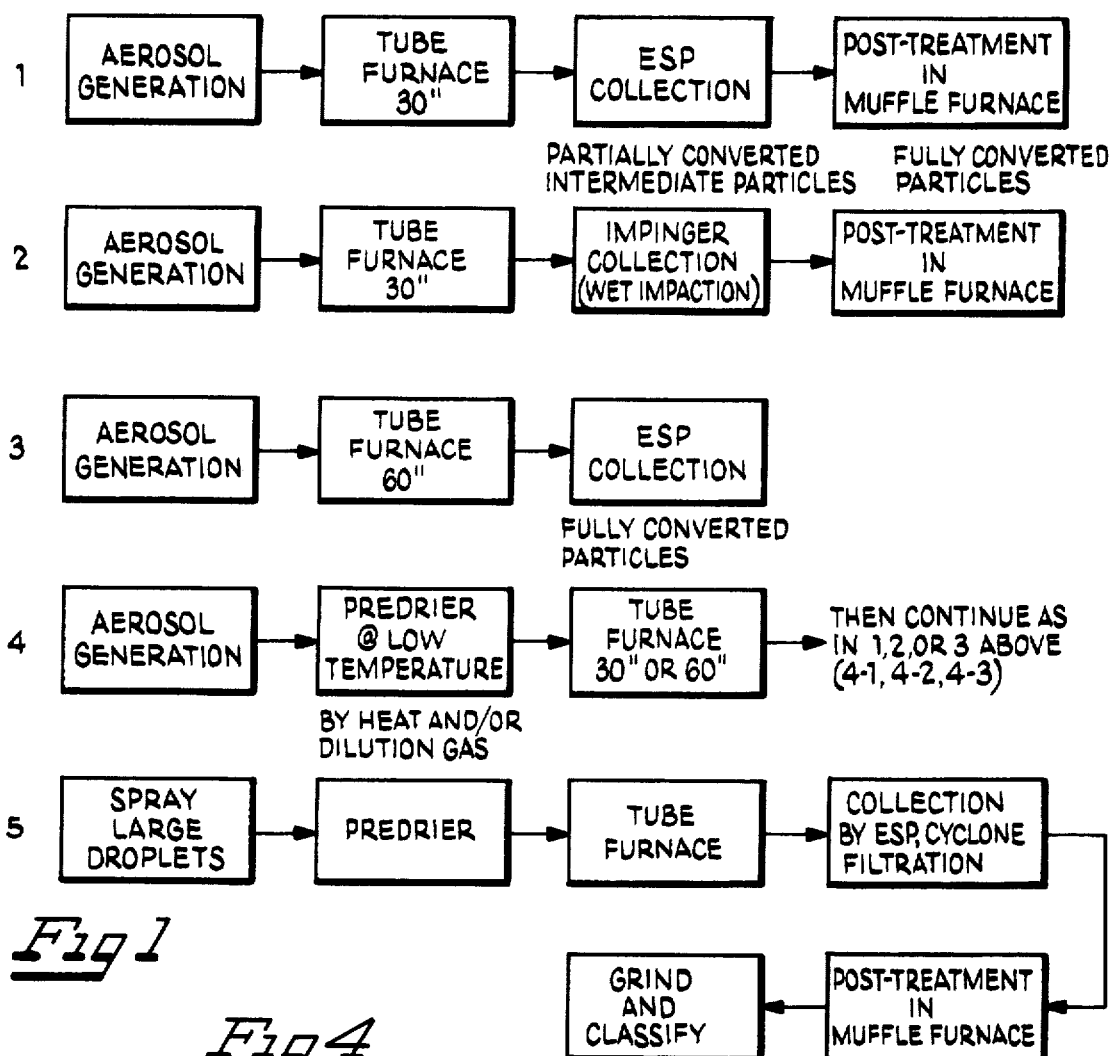
FIG. 1 is a flow diagram of the preparation of porous cathode material according to the method of the invention.

As used throughout this specification and claims, when an electrode is designated to have a particular electrode component, it is meant any electrochemically active material which participates in the electrochemical reaction of the cell and/or an electrically conductive material for current transport. The term electrode material is meant to include components of both anode and cathode electrodes.

The process for making a porous, high surface area electrode material includes the step of generating droplets from a liquid feed which includes a carrier liquid and precursors capable of being converted into an electrode material. By "precursor", as that term is used herein, it is meant, material in any physical form (solid, liquid, solution, suspension, etc.) which is not currently in the state usable as an electrode material, but which can be converted to the intended use state upon subjection to a treatment, as described herein.

The liquid feed can be in any form capable of producing droplets, including a soluble solution, emulsion or suspension of the precursor. The liquid feed may contain a suspended particle and a carrier liquid. The liquid feed may contain a suspended particle and a dissolved species in a carrier liquid.

Droplets can be produced from the liquid feed in any conventional manner. Each method produces droplets of a characteristic size and size distribution for a given liquid feed.

The droplets may be formed as an aerosol. The term "aerosol" is used herein in the conventional sense to mean a suspension of fine solid or liquid particles in a gaseous medium. Exemplary of aerosol generator and nebulizer types which may be employed according to the present invention include compressed gas, ultrasonic and spinning disc, and combinations thereof. Further description of common atomization methods can be found in *Atomization and Sprays* by Arthur H. Lefebvre (Hemisphere Publishing Corp., New York 1989), herein incorporated by reference. Aerosol droplets formed according to the invention have a diameter in the range of 1 to 600 microns.

Droplets can also be formed by conventional spray drying methods. Spray drying involves atomizing a liquid feed containing the precursor into a fine gaseous suspension and vaporizing the carrier liquid with a hot gas. Spray drying typically produces droplets which are larger than aerosol or nebulizer generated droplets.

Exemplary of precursors which may be employed according to the present invention for the formation of a high energy density electrochemically active cathode component include one or more of, for example, metal salts such as metal nitrates, metal acetates, metal hydroxides, metal carbonates, metal alkoxyls and the like used alone or in combination with lithium and/or a lithium salt. Transition metals are particularly preferred. A number of metals salts, either alone or in combination, may be included in the feed material. Metal nitrate salts are particularly preferred due to the high solubility of most metal nitrate salts in common carrier liquids. It is contemplated that precursors to anode materials can also be treated according to the method of the invention.

The carrier liquid is selected for its ability to carry the precursor in the desired state, i.e., solution, emulsion or suspension. Any solvent which is inert to the precursor and the resultant electrode material can be used as a carrier liquid. Water, alcohols, aldehydes, ketones, esters, ethers and mixtures thereof are exemplary of liquids which may be used according to the invention. Water and alcohols are particularly preferred because of their inertness and solubilizing properties for a wide range of precursors.

The carrier liquid droplets containing the precursors are then converted into precursor particles by removing the carrier liquid. Because the droplets are rapidly dried, the intimate contact is maintained in the dried precursor particles and minimal phase separation occurs. The intimate contact of the precursor reactants and the minimal phase separation of the precursor reactants in the precursor particles substantially enhances the reaction kinetics of subsequent conversion reactions of the precursor particle.

The morphology of the precursor particles can be controlled by controlling the rate of evaporation of the carrier liquid. For example, if the precursors are highly crystalline materials, very slow evaporation of the carrier liquid would be expected to produce precursor particles containing relatively large crystals of precursor materials. Alternatively, rapid evaporation of the carrier liquid would produce more spherical precursor particles, possibly hollow crystallites and/or agglomerations of small crystals of the precursor material. If the precursor material is more amorphous in nature, then both slow and rapid evaporation of the carrier liquid would produce spherical precursor particles. However, a more rapid rate of evaporation of the carrier liquid containing an amorphous precursor material would produce larger hollow precursor particles while slow evaporation would produce very nearly solid spherical precursor particles.

A diluent gas in the gas stream used to suspend the aerosol droplets can influence the rate of evaporation of the carrier liquid. "Diluent gas" as used herein is meant to include any gas which is non-reactive with the aerosol droplets and which is not originally present for the suspension of aerosol droplets. Likewise, selection of carrier liquids with particular boiling points and vapor pressures will also influence the rate of evaporation of the carrier liquid and the resultant precursor particle morphology. For example, a precursor material may be dissolved in a carrier liquid which is a blend of low boiling point solvent (a liquid which solubilizes the precursor) and a high boiling point diluent liquid (liquid which does not solubilize the precursor). As the solvent is evaporated, the precursor material is precipitated or crystallized in the non-solvating diluent which is vaporized at a higher temperature to provide porosity. "Diluent liquid," as used herein, is meant to include any non-solvent (liquid which does not solubilize a precursor) used in the liquid feed.

Porosity is introduced by evaporation of the carrier liquid and evolution of by-product gases which leaves voids and cracks in the resultant precursor particles. Porosity is also introduced into the resultant precursor particle by agglomeration of individual precursor particles to form a larger precursor particle with surface irregularities and numerous channels within the precursor particle. Precursor particle porosity can be controlled by controlling the amount of and rate of evaporation of the carrier liquid.

Particle size is a function of the relative amount of precursor material in the liquid feed. A higher concentration of precursor material results in precursor particles of larger particle size for carrier liquid droplets of the same diameter. Precursor particles according to the invention have diameters in the range of 0.01 to 10 microns. Precursor particle size distribution can also be substantially narrowed by removing droplets from the large size portion of the distribution using an impactor. An impactor is a conventional particle collector utilizing the inertial impaction of the particle on a dry or treated surface. Collection efficiency is typically poor for smaller particles. For more on impactor theory and design, see Marple and Willeke, *Atmos. Envir.* Vol. 10, 891–896 (1976), herein incorporated by reference. The droplets so collected can be returned to the stock feed solution.

The precursor particles are then converted into particles of the electrode material. The precursor particle powders enter a heat zone, where a thermal treatment effects their conversion to the electrode material while they are gas borne. This prevents agglomeration of the precursor particle and avoids problems associated with the highly hygroscopic nature of many of the precursor materials.

Conversion may include decomposition and/or reaction of a precursor particle into the desired electrode material. The carrier gas can also be a reactant. By way of example, lithium nitrate and manganese nitrate react at elevated temperatures to form $LiMn_2O_4$. Once the precursor particles containing lithium nitrate and manganese nitrate enter the heat zone, additional mass loss occurs due to the loss of gaseous products, (such as $NO_x$ for nitrate based precursors).

Release of gaseous products and residual carrier liquid evaporation further increases porosity.

The conversion of the precursor particle to the electrode material may occur in a single step or in a plurality of steps. By way of example, a heat treatment can be selected to partially convert the precursor particles to an intermediate compound which can be collected on the final electrically conducting substrate which will act as the current collector of the electrode. The intermediate compound is fully converted to the electrode component in a subsequent heat treatment.

By "partially converted", as that term is used herein, it is meant the incomplete conversion of a precursor particle into the desired electrode material particle. This can include conversion of the precursor particle to an intermediate compound, as well as the presence of unreacted precursor in the reacted electrode material.

By "intermediate compound," as that term is used herein, it is meant liquid carrier-free particles that result from a partial conversion of the precursor particle. The intermediate compound usually have greatly reduced hygroscopic properties and can be handled under ambient conditions.

Alternatively, the intermediate component can be collected onto an intermediate substrate. The intermediate substrate is exemplified by any substrate used to trap or collect the partially converted intermediate component. This may include solid substrates, such a metal plates or foils, screens or filters. Further, any conventional means of powder collection is within the scope of the present invention. Such methods include, but are in no way limited to, dry impaction, wet impaction, cyclone collection, electrostatic precipitation and filtration. Once the intermediate compound has been collected on an intermediate substrate it can be fully converted to the electrode material by subsequent heat treatment.

In preparation of the electrode of the invention, the electrode material particles are deposited onto an electrically conductive substrate. Deposition can be carried out by collection of the electrode material particles onto the electrically conductive substrate as described above for the intermediate compound. In particular, the electrode material particles may be deposited onto the electrically conducting substrate using electrostatic precipitation. Electrostatic precipitation may be used for the continuous production of an electrode by passing a moving foil substrate under the device for receiving the electrode material particles (see, *Industrial Electrostatic Precipitation* by Harry J. White (Addison-Wesley Publishing Company, Inc., Reading, Mass., 1963)), herein incorporated by reference.

Alternatively, the electrode material particles can be collected and deposited in a separate operation. This may be desirable when additional components for example, binder and/or a conductive material, are to be applied to the substrate. Deposition can be carried out in any conventional way known to apply powder materials to a substrate, including but not limited to dry and wet impaction and spraying and electrostatic precipitation. Electroactive materials, include, but are not limited to, metal oxides and lithium metal oxides, such as $LiV_3O_8$, $V_6O_{13}$, $LiMn_2O_4$, $MnO_2$, $LiCoO_2$ and $LiNiO_2$.

It is also within the scope of the invention to commingle two or more airborne particle streams and to co-deposit the powders onto the electrically conductive substrate.

The flow charts of FIG. 1 are exemplary of the many processing routes available to practice the invention. FIG. 1—1 illustrates a process in which the droplets are generated as an aerosol and are introduced into a 30" long tube furnace. Evaporation of the carrier liquid occurs just prior or concurrent to the conversion of the precursor particle. In this scenario, the precursor particle is partially converted to an intermediate compound which is collected by electrostatic precipitation (ESP) and post treated in a conventional furnace to complete conversion to the electrode material particles.

FIGS. 1–2 illustrates a process in which the droplets are generated as an aerosol and are introduced into a 30" long tube furnace. Evaporation of the carrier liquid occurs just prior or concurrent to the conversion of the precursor material to the precursor particle. In this scenario, the precursor particle is partially converted to an intermediate compound which is collected by wet impaction in an impinger, recovered and post treated in a conventional furnace to complete conversion to the electrode material particles.

Figure 2A:
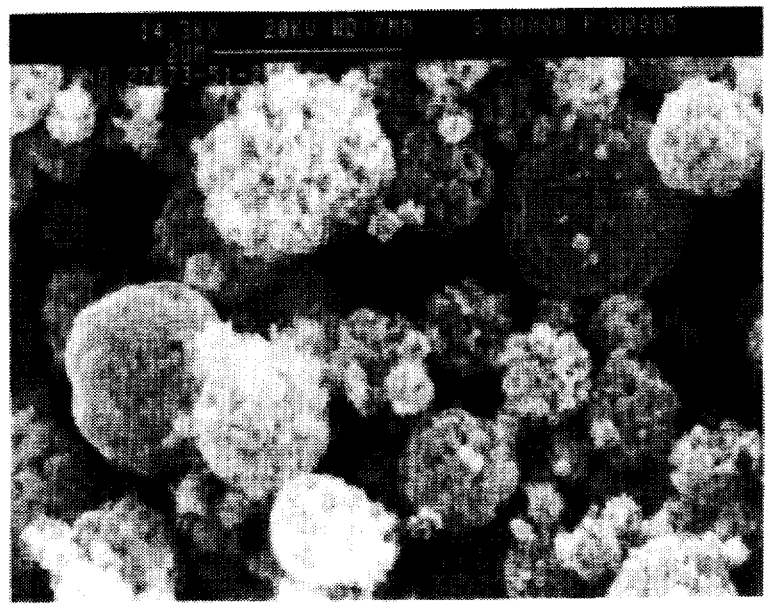
FIGS. 2(a) and 2(b) are scanning electron photomicrographs of porous $Li_xMn_yO$ particles according to the invention.
Figure 2B:
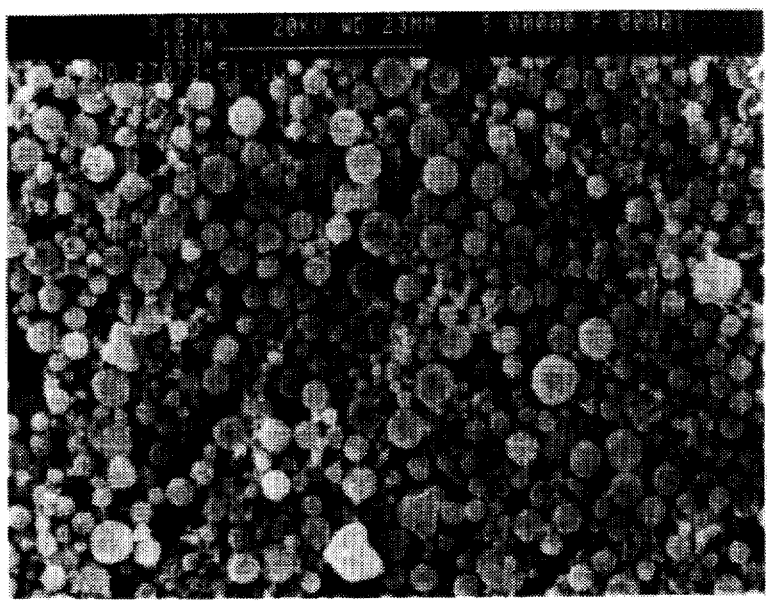
Figure 3:
FIG. 3 is a scanning electron photomicrograph on the same scale as that of FIG. 2 showing prior art $Li_xMn_yO$ particles.

FIGS. 1–3 illustrates a process in which the droplets are generated as an aerosol and are introduced into a 60" long tube furnace. Evaporation of the carrier liquid occurs just prior or concurrent to the conversion of the precursor material to the precursor particle. In this scenario, the precursor particle has a longer residence time in the hot zone of the furnace due to its longer length and the precursor particle is fully converted into the electrode material particle. The converted particle is collected by ESP onto a foil substrate.

FIGS. 1–4 illustrates a process in which the droplets are generated as an aerosol and are introduced into a predryer at a low temperature. The predryer is at a temperature which is sufficient to evaporate the carrier liquid, but does not effect the conversion of the precursor particle into the electrode material. A predryer, by way of example, may be an extended passageway or tube maintained just above room temperature. The low temperature drying step permits the slow evaporation of the carrier liquid and allows the control of precursor particle morphology and porosity as described above. The dried particle precursor can then enter a 30" or 60" long tube furnace. In this scenario, the precursor particle may be either fully or partially converted to the electrode component which handled by any of the procedures described in FIGS. 1—1 to 1-3.

FIGS. 1–5 illustrates a process in which the droplets are generated by spray drying. In this instance, the droplets are considerably larger than those generated by aerosol generators. The droplets are introduced into a predryer at a low temperature. The predryer is at a temperature which is sufficient to evaporate the carrier liquid, but does not effect the conversion of the precursor particle into the electrode material. The low temperature drying step permits the slow evaporation of the carrier liquid and allows the control of precursor particle morphology and porosity as described above. The dried precursor particles then enter a tube furnace and the heat treated precursor particles are collected by any conventional method. Post treatment to fully convert the precursor particles to the desired electrode material may also be carried out.

The invention may be further understood and appreciated with reference to the examples. The examples set forth are exemplary and are in no way intended to limit the scope of the invention.

EXAMPLE 1

Preparation of $LiMn_2O_4$ from an alcohol solution of nitrate salts.

Manganese nitrate hexahydrate ($Mn(NO_3)_2 \cdot 6H_2O$, 8.2 g) and lithium nitrate ($LiNO_3$, 1.0 g) are dissolved in 80 mL of ethyl alcohol to make a feed solution of about 9.5% metal nitrates based on solute weights. The feed solution is then transferred to a six-jet Collision nebulizer (BGI, Inc., Waltham, Mass.; Model CN-25) and an aerosol of feed solution droplets is prepared. Nebulizing pressure is about 20 psi nitrogen gas pressure. At a 20 psi operating pressure, the gas flow rate is 10 L/min and about 9.0 mL of feed solution is converted into droplets each hour.

The droplets are then passed through 10 feet of ⅝" OD polyethylene tubing in the nitrogen gas stream to effect drying of the droplets to produce substantially dry particles of intimately mixed lithium and manganese nitrates (precursor particles). At this time the particles are highly hygroscopic and can not be captured as a powder. In fact significant water may remain in the particles because of the six waters of hydration in manganese nitrate. Volumetric calculations show that a 2 micron droplet will form a 0.72 micron diameter precursor particle (uncorrected for residual liquid and porosity).

The particle stream is then passed through a quartz tube 5 feet in length and 2⅜" OD into a central heat zone (3') which is heated to 750° C. using a resistance furnace. The particles pass through the heat zone and are partially converted to the desired oxide form. The partially converted particles may be easily collected at this point since they are no longer in the highly hygroscopic nitrate form as they were upon entering the heat zone. Alternatively, the conversion conditions can be adjusted to effect complete conversion of the precursor particles to $LiMn_2O_4$. The heating zone may be extended in length, the residence time of the precursor particles in the heating zone can be increased or the temperature of the heat zone can be increased. Volumetric calculations show that a 0.75 micron diameter precursor particle will form a 0.35 micron diameter particle (uncorrected for residual liquid and porosity) due to off-gassing and the increase in density that occurs when mixed nitrates are converted into the mixed oxides.

The partially converted particles are then collected on a flat metal plate or foil, such as aluminum, nickel and stainless steel, using a flat plate-type electrostatic precipitation device (ESP). The ESP is a long rectangular channel having a series of parallel, stainless steel wires 1.0" apart and 2.0" above the grounded metal substrate and perpendicular to the gas flow. The wires are charged to −11,000 volts. In this manner the particles are collected. The collected particles are give a further heat treatment for 5 min in air at 450° C. to completely convert the precursor to $LiMn_2O_4$. The resulting powder is a black, free-flowing powder. In the instance where complete conversion is obtained prior to collection, no further heat treatment is necessary.

The particle size of the resulting $LiMn_2O_4$ powder was determined by scanning electron microscopy (SEM). The photomicrographs in FIGS. 2(a) and 2(b) show the $LiMn_2O_4$ particles to be spherical and porous in nature. The particle size ranges from about 0.2 micron to 2 micron in diameter; however, other particle size distributions having average diameters in the range of 0.001–10 microns is possible.

Thermal analysis of the partially converted oxide (the product collected on the ESP plate before further heat treatment) by differential scanning calorimetry (DSC) and differential thermal analysis (DTA) clearly indicate that conversion to the desired oxide is complete in less than 5 min at 450° C. X-ray diffraction (XRD) analysis of the product powder clearly identifies the composition as $LiMn_2O_4$.

The porosity and micron scale of the particle according to the invention may be compared to $LiMn_2O_4$ powder prepared according to a conventional "grind and sinter" method. In such conventional methods, a mixture of particulate forms of $MnO_2$ and a lithium-containing compound are reacted in a dry static state. The reaction rate is diffusion controlled and can require 20 or more hours at temperatures over 700° C. for completion. The resulting $LiMn_2O_4$ powders must first be subjected to grinding and classification before use in fabricating battery cathodes. In the method of the invention, conversion to a fine (submicron to micron), porous particles of $LiMn_2O_4$ is achieved in less than 5 minutes at 405° C. or less.

FIG. 3 is a scanning electron photomicrograph of a powder prepared according to conventional methods and is on the same scale as FIG. 2(b). The particles are of a larger dimension than those of the invention. Additionally, the particles are dense and have very low porosity. As disclosed hereinabove, porosity (which provides a large surface area to volume ratio) is desirable for battery applications.

EXAMPLE 2

Fabrication of a cathode electrode.

The $LiMn_2O_4$ powders of Example 1 are then fabricated into a cathode for evaluation in a liquid electrolyte battery with a lithium foil anode.

The $LiMn_2O_4$ cathode was prepared by making a slurry of the dry powders listed in Table 1 in isopropanol. $LiMn_2O_4$ is prepared as described in Example A. The powders are initially blended in a vibrating mixer. After blending, isopropanol is added and the powder/alcohol slurry was mixed on a rotary mixer.

TABLE 1

| Components to a $LiMn_2O_4$ cathode. | |
|---|---|
| slurry component | weight (g) |
| $LiMn_2O_4$ | 1.44 |
| poly(vinylidene)fluoride | 0.18 |
| acetylene black | 0.18 |
| isopropanol | 1.80 |

A series of electrodes are prepared by coating various amounts of the slurry onto a nickel foil (1"×1") and allowing the alcohol to evaporate to produce a dry coating. The resulting coated foil is then pressed between ferrochrome plates for 5 min at 350° C. and 30,000 psi. The resulting cathodes are mechanically strong and handleable.

The 2 cm² cathode is assembled in an electrochemical cell which includes a lithium metal foil anode of equal surface area, a lithium metal foil reference electrode and two porous polypropylene membrane separators (Celgard 2500). The cell was immersed in a liquid electrolyte solution of equal proportions of propylene carbonate (PE) and ethylene carbonate (EC) (PC:EC/1:1) containing 1M $LiClO_4$.

Figure 4:
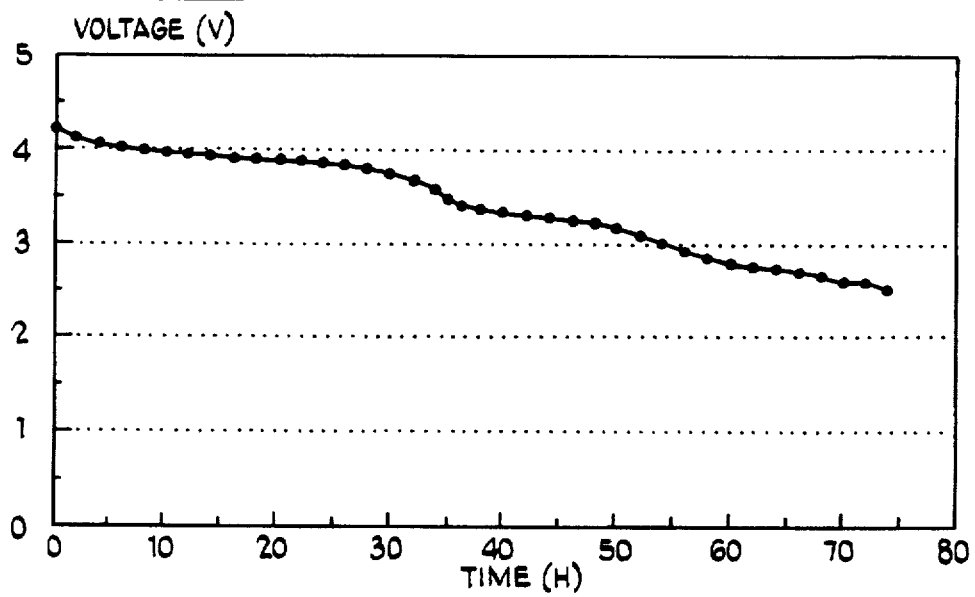
FIG. 4 is discharge curve of an electrochemical cell prepared using a cathode of the present invention.

In operation, the cathode is first charged under a constant current of 20 μA from its initial voltage of ~3 V to a voltage of ~4.25 V then discharge under the current of 20 μA down to a V of 2.5 V. A discharge curve for $LiMn_2O_4$ electrochemical cell prepared according to the present invention is shown in FIG. 4. Fully charged at point 1, the cathode is of the composition $Mn_2O_4$. An inflection at point 2 indicates the intercalation of one mole lithium to provide a cathode having a composition of $LiMn_2O_4$. The final point 3 represents a fully discharged cathode having a composition of $Li_2Mn_2O_4$.

As a comparative control, an electrode made of International Battery Association (IBA) standard sample IBA-$Li_xMn_2O_4$ (#IBA-JEC #3-Feb93) is fabricated using the same process and tested under identical conditions. The discharge capacity of the $LiMn_2O_4$ cathode of the present invention, based on the weight of $LiMn_2O_4$, is approximately three times greater than the discharge capacity of the IBA comparative control $LiMn_2O_4$ cathode.

EXAMPLE 3

Preparation of $Li_2Mn_2O_4$ from an alcohol solution of nitrate salts.

Powders of $Li_2Mn_2O_4$ are prepared using the procedure of Example 1, with the exception that the feed composition used contains a mole ratio of 1:1 $Li^+/Mn^{++}$ in place of the 1:2 $Li^+/Mn^{++}$ ratio used in the Example 1. Thus, manganese nitrate hexahydrate (7.4 g) and lithium nitrate (1.8 g) are dissolved in 80 mL of ethanol for use as the feed solution.

SEM and XRD analytical results indicate that particles of approximately the same dimension and porosity when compared with the results of Example 1. The XRD spectra are also nearly identical to those of powders of Example 1 which indicates that $Li_2Mn_2O_4$ of the same general cubic spinel structure was obtained.

EXAMPLE 4

Preparation of $Li_2Mn_2O_4$ from an aqueous solution of nitrate salts.

The same procedure of Example 3 was used to prepare $Li_2Mn_2O_4$ except that distilled water was used in place of alcohol and air was used in place of nitrogen to generate the aerosol of solution droplets. SEM and XRD data reveal that essentially the same cubic spinel form of $Li_2Mn_2O_4$ was produced.

EXAMPLE 5

Preparation of $Li_2Mn_2O_4$ from an aqueous solution of nitrate salts.

The same procedure of Example 4 was used to prepare $Li_2Mn_2O_4$ except that a 60" tube furnace was used to increase the residence time of the particles in the hot zone. Complete conversion to $LiMn_2O_4$ was obtained without the need of post-treatment.

It is readily apparent from the specification and examples that the process can be varied and modified to effect certain changes in the characteristics, in particular, composition porosity, particle size and particle size distribution, of the electrode component particles and electrodes made therefrom. Such modifications are considered to be within the scope of the present invention.

What is claimed is:

1. A method for preparing an electrode, comprising the steps of:

generating droplets of a solution of a precursor material in a carrier liquid, said precursor material capable of being converted into an active material of an electrode;

removing at least a portion of said carrier liquid from said droplet to form precursor particles;

converting said precursor particles into particles of said active electrode material, wherein parameters for the conversion of the droplet into an active electrode material are controlled to obtain a predetermined particle configuration wherein the step of generating droplets of a solution of a precursor material in a carrier liquid comprises using a carrier liquid comprising a solvent and a diluent liquid.

2. A method for preparing an electrode, comprising the steps of:

generating droplets of an emulsion of a precursor material in a carrier liquid, said precursor material capable of being converted into an active material of an electrode;

removing at least a portion of said carrier liquid from said droplet to form precursor particles; and converting said precursor particles into particles of said active electrode material.

3. The method of claim 1, wherein the step of generating droplets of a solution of a precursor in a carrier liquid comprises atomizing said solution.

4. The method of claim 1 or 2, further comprising the step of:

depositing said active electrode material onto an electrically conductive substrate.

5. The method of claim 3, wherein said atomization step is selected from the group consisting of spinning nozzle atomization, ultrasonic atomization, single-fluid atomization, spray drying and two-fluid atomization.

6. The method of claim 1, wherein the step of generating droplets of a solution of a precursor in a carrier liquid comprises generating droplets having a diameter in the range of 0.1–600 µm.

7. The method of claim 2, wherein the precursor material is selected from a group consisting of a metal salt or mixtures of metal salts.

8. The method of claim 7, wherein said metal salt comprises lithium.

9. The method of claim 7, wherein said metal salt comprises a metal of the active electrode material.

10. The method of claim 7, wherein the precursor material comprises at least two different metal salts.

11. The method of claim 1, or 2 wherein the step of converting said precursor particles into said active electrode material particles comprises thermally treating said precursor particles.

12. The method of claim 11, wherein the precursor particles are thermally treated for a period of five minutes or less.

13. The method of claim 1 or 2 wherein the step of removing said carrier liquid from said droplets comprises evaporating the carrier liquid from the precursor.

14. A method for preparing an electrode, comprising the steps of:

generating droplets of a solution of a precursor material in a carrier liquid, said precursor material capable of being converted into an active material of an electrode;

removing at least a portion of said carrier liquid from said droplet to form precursor particles;

converting said precursor particles into particles of said active electrode material, wherein parameters for the conversion of the droplet into an active electrode material are controlled to obtain a predetermined particle configuration wherein the step of removing said carrier liquid from said droplets comprises forming an agglomeration of individual precursor particles.

15. The method of claim 4, or 2 wherein the step of converting said droplets to a precursor particle comprises forming particles having a diameter in the range of 0.01 to 60 µm.

16. The method of claim 1, or 2 wherein the step of converting said precursor particles into said active electrode material particles comprises collecting said precursor particles and thermally treating said precursor particles in a furnace.

17. The method of claim 4, wherein the step of depositing said electrode active material particles comprises collecting said electrode active material particles onto an electrically conductive substrate.

18. A method of claim 17, wherein the step of collecting said active electrode material particles comprises a method selected from the group consisting of dry impaction, wet impaction, electrostatic precipitation and filtration.

19. The method of claim 17, wherein the step of collecting said active electrode material particles comprises electrostatic deposition.

20. A method for preparing an electrode, comprising the steps of:

generating droplets of a solution of a precursor material in a carrier liquid, said precursor material capable of being converted into an active material of an electrode;

removing at least a portion of said carrier liquid from said droplet to form precursor particles;

converting said precursor particles into particles of said active electrode material, wherein parameters for the conversion of the droplet into an active electrode material are controlled to obtain a predetermined particle configuration the step of converting said precursor particles into said active electrode material particles comprises thermally treating said precursor particles in a moving gas stream.

21. The method of claim 20, wherein the step of heating said precursor particles in said gas stream comprises heating by a method selected from the group consisting of radiant and conductive heat energy.

22. The method of claim 1 or 20, wherein the step of converting said precursor particle into said active electrode material comprises forming an electrode material having the composition $LiM_xO_y$, wherein M is selected from the group consisting of transition metals, and where x and y are each in the range of 1 to 10.

23. The method of claim 22, wherein said transition metal is selected from the group consisting of Mn, Ni, Co and V.

24. The method of claim 2, further comprising the step of, contacting an electrolyte to said deposited active electrode material particles.

25. The method of claim 24 further comprising the step of:

contacting a conductive material to said active electrode material particles.

26. A method for preparing an electrode, comprising the steps of:

generating droplets of a solution of a precursor material in a carrier liquid, said precursor material capable of being converted into an active material of an electrode;

removing at least a portion of said carrier liquid from said droplet to form precursor particles;

converting said precursor particles into particles of said active electrode material, wherein parameters for the conversion of the droplet into an active electrode material are controlled to obtain a predetermined particle configuration:

depositing said active electrode material onto an electrically conductive substrate.

27. The method of claim 26, wherein applying the collected active electrode material to the current collector is accomplished by a method selected from the group consisting of wet spraying processes, dry spraying process and electrostatic precipitation.

28. The method of claim 4 or 2, wherein the steps of generating droplets comprising the precursor material, removing at least a portion of the carrier liquid and converting the precursor particles into active electrode material are carried out continuously.

29. The method of claim 2, wherein the step of generating droplets of an emulsion of a precursor in a carrier liquid comprises atomizing said emulsion.

30. The method of claim 2, wherein the step of generating droplets of an emulsion of a precursor in a carrier liquid comprises using a carrier liquid comprising a solvent and a diluent liquid.

31. The method of claim 2, wherein the step of generating droplets of an emulsion of a precursor in a carrier liquid comprises generating droplets having a diameter in the range of 0.1–600 μm.

32. The method of claim 1, wherein the desired particle property is selected from the group consisting of particle size, particle porosity, degree of agglomeration of the particle, degree of crystallinity of the particle, elemental composition and degree of conversion of the precursor material.

33. The method of claim 1, wherein the process parameters to be controlled are selected from the group consisting of droplet size, precursor solution, precursor composition, diluent composition, conversion time, solvent evaporation rate, predrying of the droplets, conversion temperature and degree of conversion.

34. A method for preparing an electrode, comprising the steps of:

generating droplets of a solution of a precursor material in a carrier liquid, said precursor material capable of being converted into an active material of an electrode;

removing at least a portion of said carrier liquid from said droplet to form precursor particles;

converting said precursor particles into particles of said active electrode material, wherein parameters for the conversion of the droplet into an active electrode material are controlled to obtain a predetermined particle configuration wherein the step of converting said precursor particle into said active electrode material particles comprises:

heating the precursor particles in a moving gas stream, the heat sufficient to partially convert said precursor particles to said active electrode intermediate component;

collecting said partially converted active electrode material intermediate component particles and heating the partially converted material under conditions sufficient to obtain said electrode material.

35. The method of claim 11, wherein the step of collecting said intermediate compound particles comprises collecting said particles onto an electrically conducting substrate.

36. A method for preparing an electrode, comprising:

generating droplets of a solution or emulsion of a precursor material in a carrier liquid, using a carrier liquid comprising a solvent and a diluent liquid, said precursor material capable of being converted into an active material of an electrode;

removing at least a portion of said carrier liquid from said droplet to form precursor articles; and converting said precursor particles into particles of said active electrode material.

37. A method for preparing an electrode comprising:

generating droplets of a solution or emulsion of a precursor material in a carrier liquid, said precursor material capable of being converted into an active material of an electrode;

removing at least a portion of said carrier liquid from said droplet to form precursor articles;

heating the precursor particles in a moving gas stream, the heat sufficient to partially convert said precursor particles to an active electrode intermediate component;

collecting said partially converted active electrode material intermediate component particles; and heating the partially converted material under conditions sufficient to obtain said active electrode material.

38. A method for preparing an electrode, comprising:

generating droplets of a solution of a precursor material in a carrier liquid, said precursor material capable of being converted into an active material of an electrode;

removing droplets of particles not having a predetermined particle property;

removing at least a portion of said carrier liquid from said droplet to form precursor particles;

converting said precursor particles into particles of said active electrode material.

39. The method of claim 38, wherein the removed droplets are returned to the precursor solution.

40. The method of claim 38 wherein the removal of larger particle sizes is accomplished by impaction of the particles on a dry or treated surface.

41. A method for preparing an electrode, comprising the steps of:

generating droplets of a solution of a precursor material in a carrier liquid, said precursor material capable of being converted into an active material of an electrode and selected from the group consisting of metal acetates and metal alkoxides;

removing at least a portion of said carrier liquid from said droplet to form precursor particles; and converting said precursor particles into particles of said active electrode material.

42. A method for preparing an electrode, comprising:

generating droplets of a solution or emulsion of a first precursor material in a carrier liquid, said precursor material capable of being converted into an active material of an electrode;

removing at least a portion of said carrier liquid from said droplet to form precursor particles, so as to form a first airborne particle stream;

generating droplets of a solution or emulsion of a second precursor material in a carrier liquid, said precursor material capable of being converted into an active material of an electrode;

removing at least a portion of said carrier liquid from said droplet to form precursor particles, so as to form a second airborne particle stream;

commingling the first and second airborne particle streams;

converting said precursor particles into particles of said active electrode material; and depositing said active electrode material onto an electrically conductive substrate.

* * * * *

UNITED STATES PATENT AND TRADEMARK OFFICE
CERTIFICATE OF CORRECTION

PATENT NO.  : 5,589,300
DATED       : December 31, 1996
INVENTOR(S) : Fauteux et al.

It is certified that error appears in the above-indentified patent and that said Letters Patent is hereby corrected as shown below:

Col. 10 line 30    After claim delete " 2 " and insert instead -- 1 --.

Col. 12 line 51    After claim delete " 11 " and insert instead -- 34 --.

Signed and Sealed this

Seventeenth Day of June, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,589,300
DATED : December 31, 1996
INVENTOR(S) : Fauteux et al.

It is certified that error appears in the above-indentified patent and that said Letters Patent is hereby corrected as shown below:

Col. 1, line 5     After abandoned. insert -- The invention was made with Government support under contract number 93-F151600-000 awarded by the Central Intelligence Agency --.

Signed and Sealed this

Twelfth Day of August, 1997

Attest:

BRUCE LEHMAN

*Attesting Officer*     Commissioner of Patents and Trademarks